United States Patent

[11] 3,576,498

[72] Inventor Julian D. Hirsch
New Rochelle, N.Y.
[21] Appl. No. 866,486
[22] Filed Oct. 15, 1969
[45] Patented Apr. 27, 1971
[73] Assignee The Singer Company
New York, N.Y.

[54] SWEEP FREQUENCY OSCILLATOR DRIFT CORRECTION SYSTEMS
6 Claims, 3 Drawing Figs.

[52] U.S. Cl. ........................................ 331/14,
331/4, 331/178
[51] Int. Cl. ........................................ H03b 23/00
[50] Field of Search ........................................ 331/14, 4,
178

*Primary Examiner*—John Kominski
*Attorneys*—Marshall J. Breen and Chester A. Williams, Jr

ABSTRACT: A system for stabilizing the frequency of a voltage-controlled sweep frequency oscillator driven from a sawtooth generator is disclosed. The oscillator drives a frequency discriminator centered at the desired minimum low frequency of the oscillator. During the flyback interval of the sawtooth generator, a single-shot multivibrator is triggered which, by switching, removes the generator sweep voltage and the center frequency voltage from the oscillator and substitutes therefor a predetermined zero set voltage which returns the oscillator frequency to the same minimum low frequency just before each sweep begins. The error voltage from the discriminator, sampled during this period, is applied to a low-leakage capacitor which continuously supplies an integrated correction signal to the oscillator. The multivibrator returns to its stable state at the beginning of each sweep period and switches the oscillator back to its normal sweep control by the sawtooth generator.

INVENTOR.
Julian D. Hirsch

BY

ATTORNEY

WITNESS:

INVENTOR.
Julian D. Hirsch
BY
Marshall J. Breen
ATTORNEY

WITNESS:
Marvin Rothenberg

SWEEP FREQUENCY OSCILLATOR DRIFT CORRECTION SYSTEMS

BACKGROUND OF THE INVENTION

Voltage-controlled oscillators have found many uses in the field of electronics. One important use is as a sweep frequency local oscillator of a scanning spectrum analyzer. Here the conventional sawtooth generator which controls the horizontal sweep rate of the scanning beam of an oscilloscope display also controls the frequency of the local sweep oscillator so that calibrated points on the horizontal axis of the display correspond accurately to specific frequencies of interest in the input signal. Any drift in the local oscillator frequency results in errors in the true frequency read from the display.

Prior art systems for compensating for frequency drift errors have used expensive reference oscillators of precise and known frequency. The fixed signals from the reference oscillators of these prior art systems are momentarily substituted for the sweep-frequency oscillator signal during the flyback interval in a discriminator feedback loop to fix the upper and lower frequency limits. Apart from being complicated and expensive, these prior art systems suffer from inflexibility in that the sweep limits are fixed. This would present difficulties in applications to spectrum analyzers where variable and nonlinear sweeps are desirable. Furthermore, these prior art systems are dependent on the slope characteristic of the discriminator which itself is subject to long term change.

SUMMARY OF THE INVENTION

It is therefore an object of this invention to provide a frequency drift correction system for a voltage-controlled oscillator which does not require the use of a reference oscillator.

It is a further object of this invention to provide a frequency drift correction system for a repetitively swept oscillator which correction extends over a long term period which exceeds the duration of one sweep.

It is a still further object of this invention to provide a frequency drift correction system of the above type in which the correction is independent of the sweep function and essentially assures that the minimum low frequency of the oscillator is periodically sampled and upgraded.

It is a still further object of this invention to provide a frequency drift correction system for a swept oscillator which is substantially independent of the instabilities of the oscillator components and of the normal control voltages applied thereto.

The objects of this invention are attained by transferring the ultimate control of the oscillator frequency from the instabilities of its own circuit components and control voltages to the center-frequency stability of a frequency discriminator and to the stability of a DC correction amplifier.

In the present application to a spectrum analyzer, the lower limit of the oscillator frequency range is ideally the intermediate frequency (IF) of the superheterodyne receiver for which it is the local oscillator. Regardless of the center frequency (or the maximum frequency at the end of the sweep), the oscillator control voltages are returned to a predetermined "zero set" point at the end of each sweep and during the flyback period. This returns the oscillator frequency to its lower frequency limit which is actually the IF frequency of the analyzer. The oscillator drives a frequency discriminator centered at the IF frequency through suitable amplifiers and/or amplitude limiters. The DC output of the discriminator is then proportional in amplitude and polarity, to the error difference between the desired oscillator frequency and its actual frequency.

When this error voltage has been established, a switch connects the discriminator output, through a high impedance, to a low leakage capacitor and "dumps" a charge into it. The capacitor is in the gate-to-source circuit of a field-effect transistor (FET) connected as a source follower and acts as a storage or holding means for the error voltage which is thus integrated over the operating time of the instrument.

The FET output is continuously summed with the oscillator control voltage which normally consists of a fixed center frequency control voltage and a sawtooth sweep voltage. Any tendency for the oscillator average frequency to drift from its established center value is countered by the voltage derived from the capacitor as it is repetitively charged during the flyback period by the discriminator error voltage which may be either positive or negative. Averaged over long time periods, this feedback tends to maintain the oscillator starting frequency (its lower limit) at the center frequency of the discriminator, which is the same as the IF frequency.

The actual switching may be done by reed relays or preferably by FET's operating in a switching mode. Various auxiliary switching functions, not basic to the correction process, may be required in a specific application. These include blanking the display to eliminate confusing presentations during the correction process.

DESCRIPTION OF THE INVENTION

Figure 1:
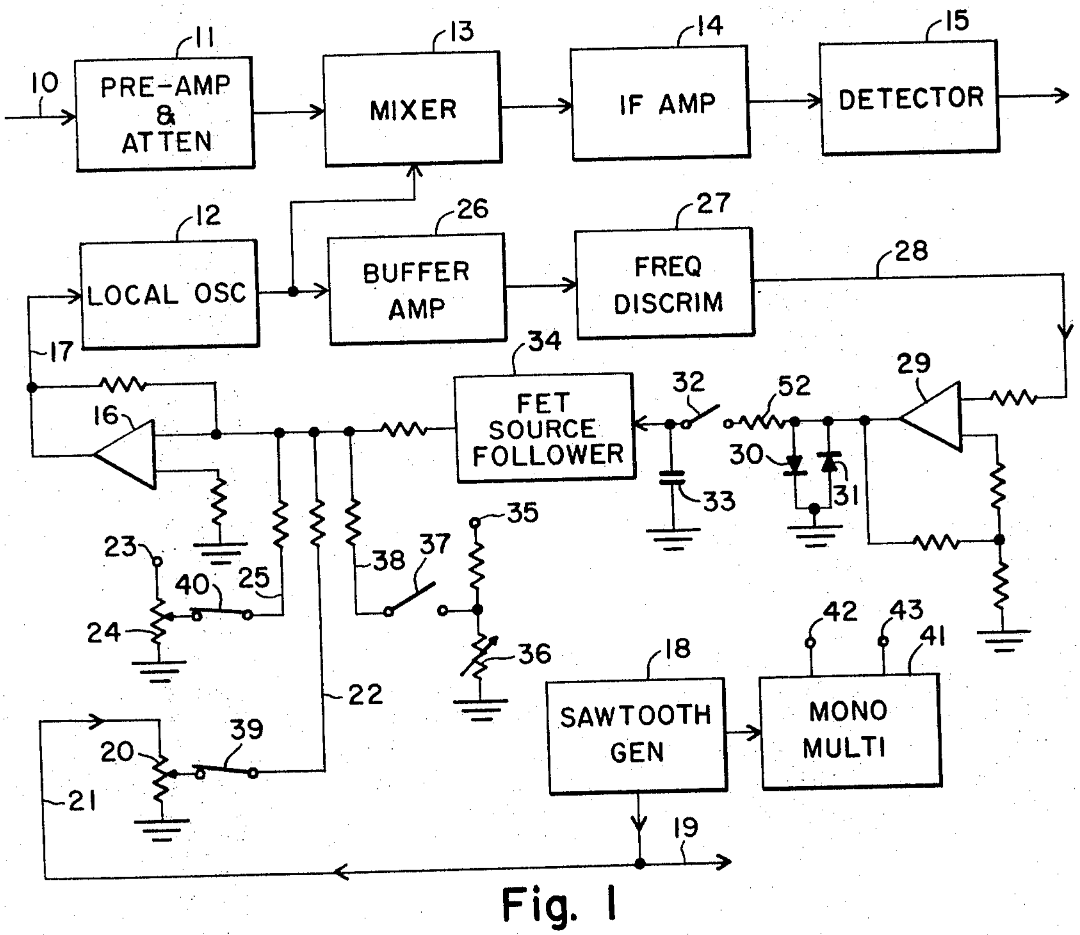
FIG. 1 is a block diagram illustrating the drift correction system of this invention as applied to the local oscillator of a scanning spectrum analyzer.

In FIG. 1, 10 represents the signal input to the attenuator and wide band amplifier 11 of a scanning spectrum analyzer. The output signals from the amplifier 11 may be heterodyned with the output of a local oscillator 12 in a mixer 13. The output of the mixer 13 is amplified in a relatively narrow band intermediate frequency (IF) amplifier 14. If the incoming signal at 10 contains a frequency which differs from the frequency of oscillation of the local oscillator 12 by an amount equal to the intermediate frequency, the mixer 13 provides a signal at the intermediate frequency which is amplified by the IF amplifier 14. The output of the IF amplifier 14 is detected in detector 15 and the detected signal, after suitable video amplification, is applied to the beam deflection devices, not shown, of a cathode ray tube to produce a vertical beam deflection as is well known in this art.

Spectrum analyzers are usually employed to provide a visual indication of signals within a predetermined frequency spectrum. In order to achieve this result, the frequencies in the predetermined spectrum are converted in sequence to the intermediate frequency by cyclically sweeping the frequency of the local oscillator 12 between suitable minimum and maximum frequencies. Thereby frequencies in a relatively wide band of frequencies are converted in sequence to the IF frequency during each frequency scan of the local oscillator 12 and produce vertical deflection signals for the display device, not shown.

The voltage-controlled local oscillator 12, of any desired construction, responsive to the control signal appearing at the output of DC amplifier 16 on line 17, generates a signal of frequency related to the magnitude of the control signal.

A conventional sawtooth generator 18 generates a sawtooth voltage which is applied on line 19 to control the horizontal deflection of the display device not shown. This sawtooth voltage is also applied to a potentiometer 20 by line 21 which selects a portion thereof as a input on line 22 to the amplifier 16. It will be seen from the above that the output signal from the local oscillator 12 will be repetitively swept over a band of frequencies in synchronism with the sawtooth generator 18 and therefore in synchronism with the horizontal deflection of the display device. Thus, any frequencies in the input signal at 10 will be repetitively converted to the IF frequency, detected and presented as vertical deflections at discrete intervals along the horizontal base line of the display. A fixed DC reference voltage applied at 23 may be controlled by potentiometer 24 so that a portion thereof may be selectively applied on line 25 to the input of the amplifier 16. The average voltage input to the amplifier 16 may thus be adjusted to establish different desired center frequencies for the output of the local oscillator 12 as is well known.

Thus far there has been described a conventional scanning spectrum analyzer without drift correction for the local oscillator. It will be apparent that fluctuations in environmental conditions such as temperature, humidity, shock and vibration will severely effect the stability of the voltage-controlled local oscillator 12 so that, after a period of use, a given control voltage input will no longer produce the same frequency output. The result is that the instrument will gradually drift out of calibration and measurements will be in error and possibly without knowledge on the part of the operator.

It is in order to prevent this drift difficulty that the circuit of the present invention has been primarily devised. This circuit will now be described in the environment of the spectrum analyzer already described.

Referring again to FIG. 1, the output of the local oscillator 12 is applied to an isolation buffer amplifier 26 which drives a frequency discriminator 27 having a very stable center frequency accurately fixed at the IF frequency of the IF amplifier 14. The DC output of the discriminator 27 is applied on line 28 to the input of a DC amplifier 29. Clipping diodes 30 and 31, connected to the output of amplifier 29, limit the excursions of the output signal for both polarities. A switch 32, which will be described later, connects the limited output of amplifier 29 to a low-leakage capacitor 33. The voltage on capacitor 33 is presented to the input of amplifier 16 preferably through a field effect transistor (FET) source follower 34 so that a very high impedance is presented to the capacitor 33 even though the input impedance of amplifier 16 is low.

A fixed DC reference voltage is applied to terminal 35 and a portion thereof, adjustably controlled by variable resistor 36, is applied through switch 37 to the input of the amplifier 16 on line 38. As will be discussed later, the value of this selected voltage on line 38 is such that, when the sawtooth control voltage on line 22 and the center frequency control voltage on line 25 are removed by the simultaneous opening of switches 39 and 40 respectively, the local oscillator will, responsively to the selected voltage on line 38, be returned to its minimum output frequency which is the IF frequency of the IF amplifier 14.

A monostable multivibrator 41 is triggered to its quasi-stable state by the negative excursions of the output signal of the sawtooth generator 18 and remains in this state only during the flyback interval. Complementary outputs 42 and 43 of the multivibrator 41 change states in the opposite sense when the multivibrator is triggered and when it reverts to its stable state.

The output signals from 42 and 43 are used to actuate switch pairs (32 and 37) and (39 and 40) respectively such that 32 and 37 are closed only during the flyback interval and 39 and 40 are closed only during the positive sweep interval.

While reed relays may be used for the switches 32, 37, 39 and 40 in such a system, it is preferable to use FET's in a switching mode for this function.

Figure 2:
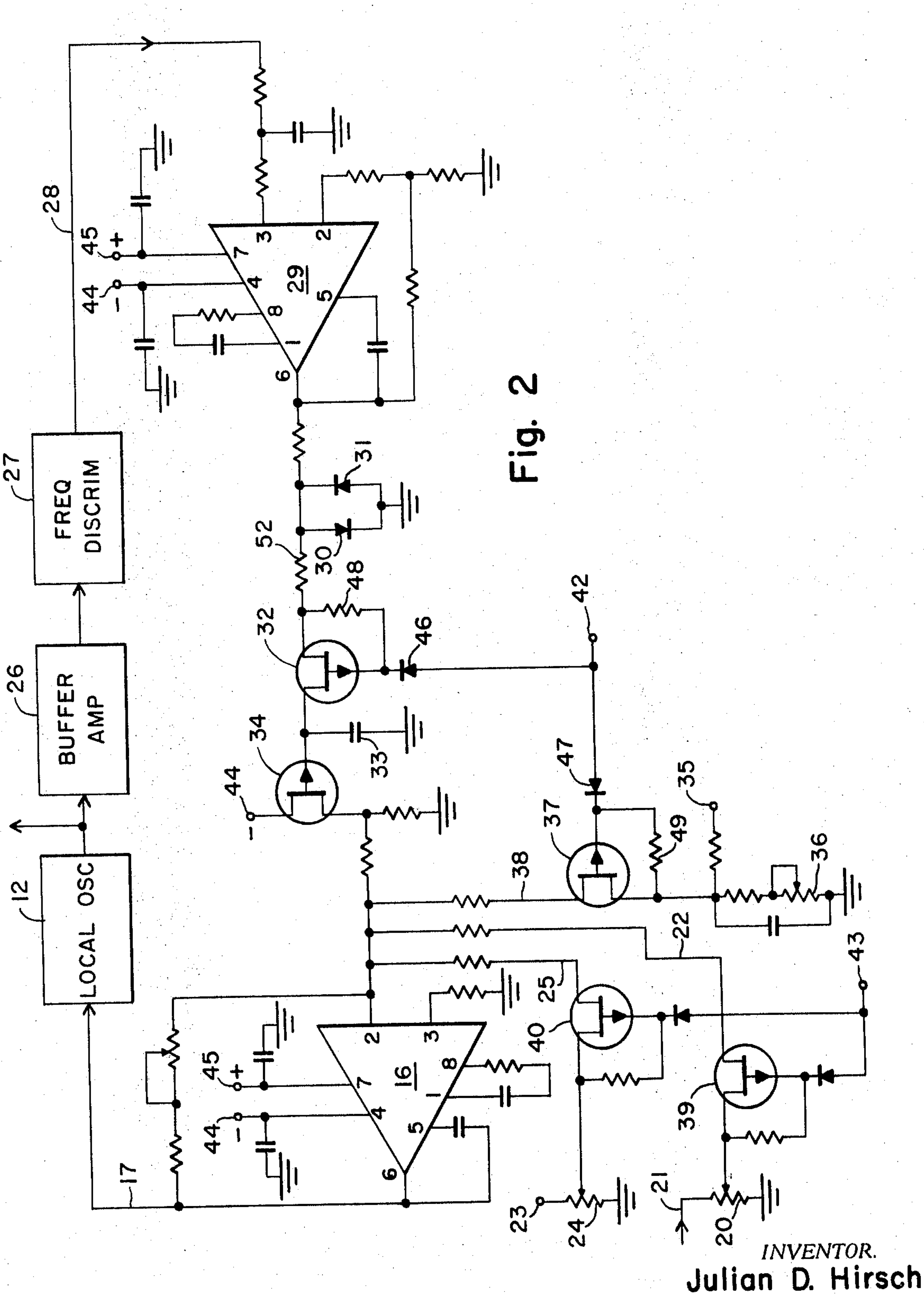
FIG. 2 is a more detailed diagram of the drift correction system of FIG. 1.

FIG. 2 shows the specific connections of the conventional FET's in this switching system and further shows the use of conventional integrated circuit operational amplifiers for the DC amplifiers 16 and 29 of FIG. 1. The components shown in FIG. 2 are only those used in obtaining the drift correction and the same reference numerals as used in FIG. 1 refer to the same element.

As shown in FIG. 2, each of the DC amplifiers 16 and 29 may conveniently be a type uA709C high-gain operational amplifier, commercially obtainable from Fairchild Semiconductor. These are conventional amplifiers well known in the art and operate from a split DC power supply applied to terminals 44 and 45.

The junction FET's used for switches 32, 37, 39 and 40 and for the source follower 34 may be the type 2N460 units well known and commercially obtainable from Motorola. It will be noted that the conduction of FET's 32 and 37 is controlled by the signal applied to terminal 42. When this signal is low the FET's 32 and 37 are biased below cutoff by the current flow in resistances 48 and 49. When the signal at 42 goes high, the diodes 46 and 47 conduct and apply a biasing voltage to the gates which drives the FET's 32 and 37 into conduction. The action of the FET's 39 and 40 with respect to the voltage at terminal 43 is the same as above and, since the signals at 42 and 43 are complementary, the FET switch pairs (32 and 37) and (39 and 40) are opened and closed simultaneously in opposite sequence.

OPERATION

The operation of the circuit of this invention will now be explained by reference to the waveforms illustrated in FIG. 3.

Figure 3:
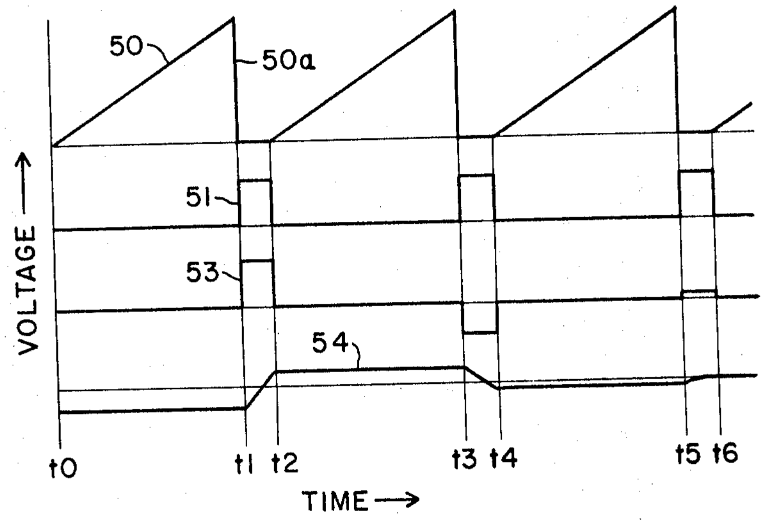
FIG. 3 is a graphical representation of the voltage waveforms with respect to time and taken at various points in the circuits of FIGS. 1 and 2.

The sawtooth generator 18 produces a typical output waveform of voltage versus time as shown at 50 in FIG. 3. The time scale is divided into intervals marked $t_o$ to $t_6$. The linear sweep during $t_o$ to $t_1$ of the sawtooth wave 50 represents the sweep interval and the interval $t_1$—$t_2$ is the flyback interval. During the interval $t_o$—$t_1$ the sawtooth 50 on line 19 provides horizontal beam scanning of the display, the beam being returned to its starting point during the interval $t_1$—$t_2$. During the sweep $t_o$—$t_1$, the local oscillator 12 is swept through a frequency band controlled by potentiometer 20 with a center frequency controlled by the setting of potentiometer 24.

During the flyback interval $t_1$—$t_2$, the negative-going portion 50*a* of the sawtooth voltage 50 triggers the monostable multivibrator 41 to its quasi-stable state and the output signal at terminal 42 goes high as shown by the waveform 51 of FIG. 3. The complementary signal at terminal 43, which has been high during the interval $t_o$—$t_1$, goes low simultaneously. The signal 51 remains high during the flyback interval $t_1$—$t_2$ and goes low at the end of this interval when the multivibrator 41 reverts to its stable state. The complementary signal (not shown) at 43, of course, goes high at the end of the interval $t_1$—$t_2$.

From the above it will be seen that during the sweep $t_o$—$t_1$, switches 39 and 40 are closed and the local oscillator is controlled by the sawtooth voltage and center frequency voltage applied on lines 22 and 25 to the amplifier 16. At time $t_1$, switches 32 and 37 are closed and switches 39 and 40 are opened. This removes the control voltages on lines 22 and 25 and connects the output of amplifier 29 to the storage capacitor 33. At the same time, a fixed reference voltage is applied on line 38 to the input of the amplifier 16. This reference voltage is termed a "zero set" voltage and is of a value which forces the local oscillator 12, in the absence of error, to produce an output signal of a frequency equal to the IF frequency of the IF amplifier 14. Thus at $t_1$, if the local oscillator output frequency is not at the IF frequency, the discriminator 27 produces an error voltage on line 28 which is amplified in amplifier 29 limited by diodes 30 and 31 and charges the storage capacitor through a resistance 52.

The "zero set" voltage may be adjusted with the spectrum analyzer in a nonsweeping mode (sawtooth disabled). With the FET switches activated, i.e. switches (32 and 37) closed and switches (39 and 40) open, the zero set control 36 is adjusted for maximum base-line rise on the display indicating that the local oscillator 12 is producing the IF frequency.

The error voltage on line 28 produced by the discriminator 27 is shown by waveform 53 in FIG. 3. This voltage will vary widely during the scanning times $t_o$—$t_1$, $t_2$—$t_3$ etc., and it is only sampled during the flyback times $t_1$—$t_2$, $t_3$—$t_4$ etc., and it may be positive or negative. In the example shown in FIG. 3, a positive drift error exists at $t_1$—$t_2$. The drift error is negative at the next interval $t_3$—$t_4$ and it is slightly positive at the interval $t_5$—*ta*J6.

The voltage on the capacitor 33 cannot change instantaneously but depends on its previous charge and on the charging resistance 52. This capacitor voltage will vary as shown by waveform 54 in FIG. 3, the error voltage tending to drive the capacitor voltage to zero value within several scans.

The capacitor 33 is in the gate-to-source circuit of the FET source follower 34. The high input impedance of the source follower 34 is important in preventing uncontrolled discharge of the capacitor 33 and assures that the capacitor voltage is always a true measure of the integrated error. The output of the source follower 34 is summed during each scan interval with the variable oscillator control voltage consisting of the sawtooth sweep control voltage on line 22 and a fixed center frequency control voltage on line 25. Any tendency for the oscillator average frequency to drift from its established center frequency value is countered by the voltage 54 thus derived from the capacitor 33 as it is repetitively charged by the error voltage 53 during each flyback interval. Averaged over long time periods, this feedback tends to maintain the starting frequency of the oscillator (or "zero frequency") at the center frequency of the discriminator, which is the same as the IF frequency.

The choice of time constant in the integrator, which may be controlled essentially by the value of the resistance 52, is dependent on the sweep time and the natural drift rate of the oscillator 12. It is undesirable for the displayed signal pip to shift back and forth from sweep-to-sweep. It appears that the optimum condition exists when the pip drifts a fraction of a division (such as 5 percent of the total sweep-width) and is pulled back to its correct position in several scans.

It is apparent from the above that the drift correction technique of this invention transfers the ultimate control of oscillator frequency from the instabilities of its circuit components and control voltages to the center frequency stability of a discriminator and the stability of the correction DC amplifier. If necessary, the discriminator can employ crystal control for maximum stability and the stability of present day compensated DC amplifiers is an accomplished fact.

The technique according to this invention is especially valuable when a logarithmic frequency sweep is used covering several decades. The expansion of the frequency scale near zero makes even small drifts highly noticeable and objectionable.

It is to be understood that the embodiment shown and described herein is illustrative only and that further modifications of this invention may be implemented by those skilled in the art without departing from the scope and spirit of the invention. Also, this invention is not limited to linear functions but may be used to transform any known input voltage function of time to the proper frequency function of time. Having thus set forth the nature of this invention,

I claim:

1. A stabilized sweep frequency generator responsive to an applied input control signal comprising:

a voltage-controlled oscillator for generating an output signal having a frequency which varies as a function of the magnitude of a control voltage applied to its input;

a discriminator for developing an error signal proportional to the deviation of the frequency of an input signal from a fixed center frequency;

means applying said output signal to the input of the discriminator;

means for generating a periodic variable control signal;

means for supplying a fixed reference control signal;

means for periodically substituting the reference control signal for the periodic variable control signal as control input to the oscillator;

means for sampling the error signal from the discriminator only during the time said reference control signal is applied to said oscillator;

means for integrating said sampled error signal; and means presenting said integrated error signal as a correction signal to the control input of said oscillator.

2. A stabilized sweep frequency signal generating system for cyclically generating a sweep signal of a frequency proportional to the magnitude of an applied input signal comprising:

a voltage-controlled oscillator responsive to an applied control signal for generating a variable frequency output signal;

a frequency discriminator having a stable center frequency and an input connected to said variable frequency output signal to produce an output error signal;

a sawtooth generator for generating a variable control signal;

means for supplying a fixed reference control signal;

switching means controlled by said sawtooth generator for periodically substituting said fixed control signal for said variable control signal as the control input to said oscillator;

a storage capacitor;

means for periodically charging said storage capacitor from said error signal only during the time when said fixed control signal is applied to said oscillator to develop a capacitor voltage; and means presenting said capacitor voltage as a correction signal to the control input of the oscillator.

3. A stabilized sweep frequency signal generating system for cyclically generating a sweep signal of a frequency proportional to the magnitude of an applied input signal comprising:

a voltage-controlled oscillator responsive to an applied control voltage for generating a variable frequency output signal;

a frequency discriminator having a stable center frequency and an input connected to said output signal to produce an output error signal;

a sawtooth generator for generating a sawtooth control signal;

means for supplying a reference control signal;

a monostable multivibrator controlled by said sawtooth generator to supply periodic switching signals during the flyback time of the sawtooth signal;

switching means responsive to said switching signals for alternatively substituting said reference control signal for said sawtooth control signal as the input control signal to the oscillator;

a storage capacitor;

means for charging said capacitor from said error signal only during the time when said reference signal is applied to said oscillator to develop a capacitor voltage; and means coupling said capacitor voltage to the control input of said oscillator to supply an integrated correction signal thereto.

4. A system in accordance with claim 3, wherein the means for charging said capacitor includes:

a DC amplifier connected to the discriminator output;

a dual-polarity limiter connected to the amplifier output; and a charging resistor for controlling the charging time constant.

5. A system in accordance with claim 3, wherein the means coupling said capacitor voltage to the control input of said oscillator includes:

a field-effect transistor source-follower amplifier and a DC amplifier connected in cascade.

6. A system in accordance with claim 3, wherein the switching means includes:

field-effect transistors connected in a switching mode.

PO-1050
(5/69)

UNITED STATES PATENT OFFICE
CERTIFICATE OF CORRECTION

Patent No. 3,576,498 Dated April 27, 1971

Inventor(s) Julian D. Hirsch

It is certified that error appears in the above-identified patent and that said Letters Patent are hereby corrected as shown below:

Column 3, line 74, "2N460" should be --2N5460-- .

Column 4, line 70, "taj6" should be --$t_6$-- .

Signed and sealed this 3rd day of August 1971 .

(SEAL)
Attest:

EDWARD M.FLETCHER,JR.
Attesting Officer

WILLIAM E. SCHUYLER, JR.
Commissioner of Patents